2,604,600

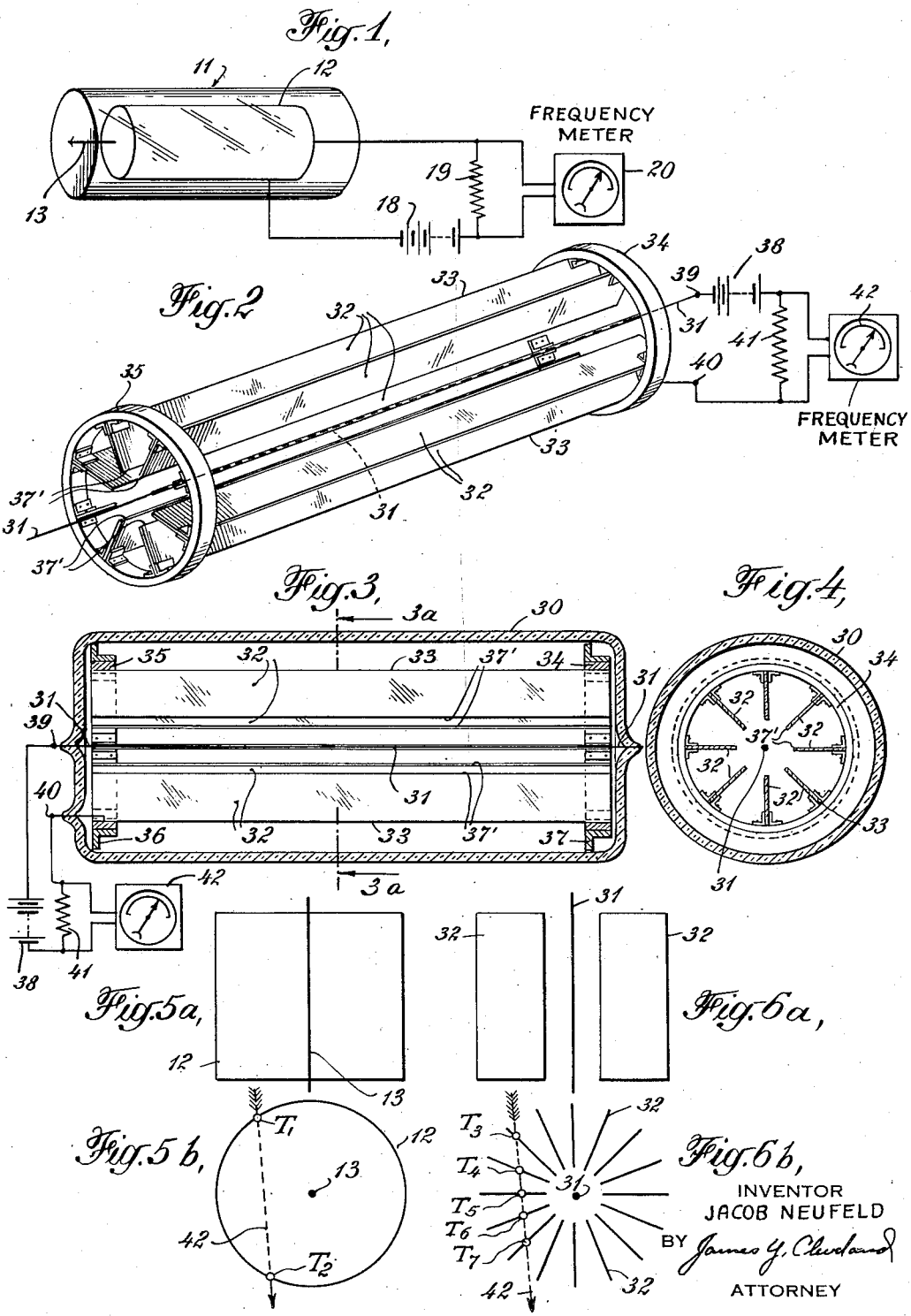
INVENTOR
JACOB NEUFELD
BY James Y. Cleveland
ATTORNEY

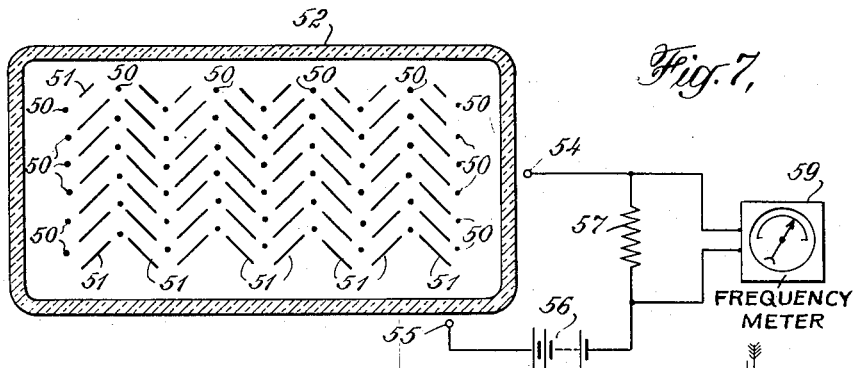
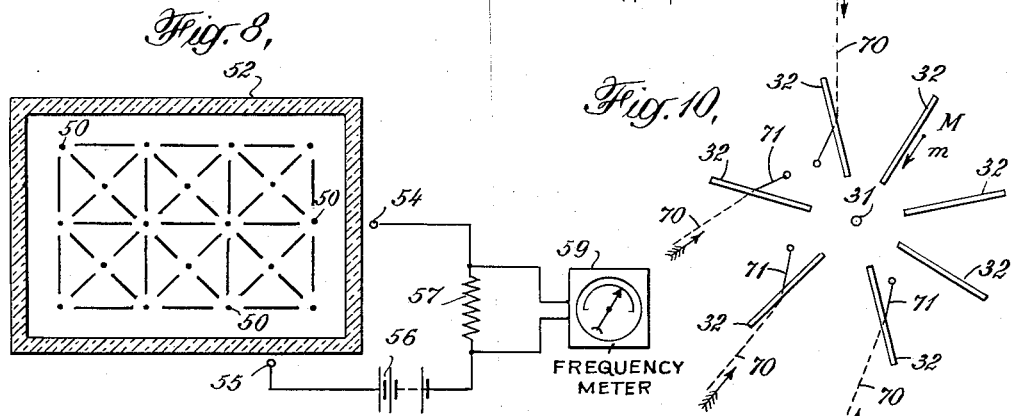
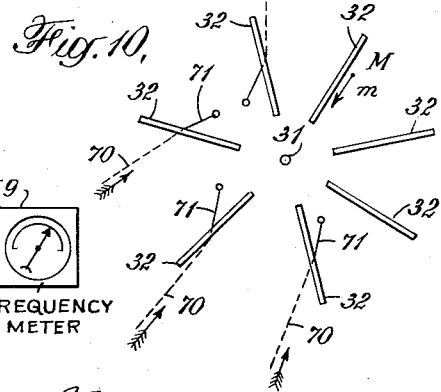
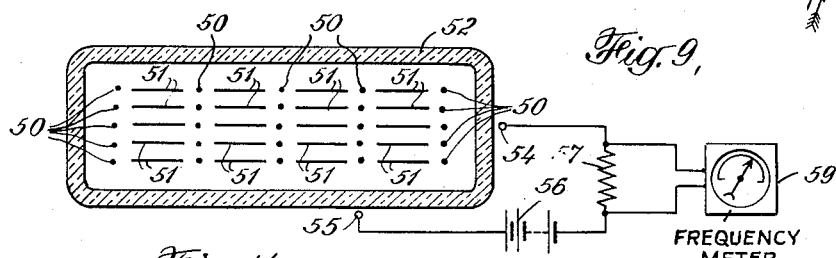
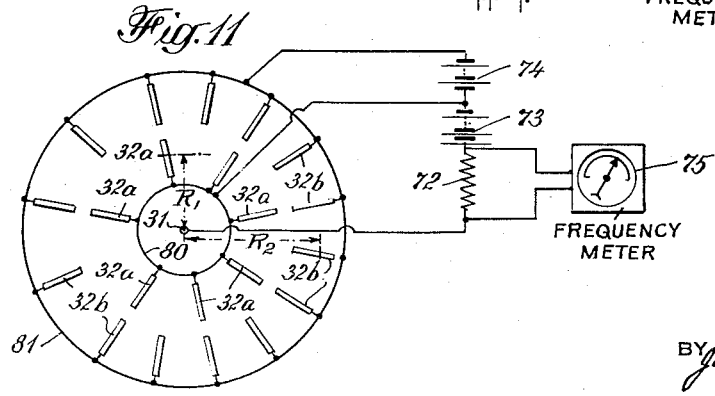
INVENTOR
JACOB NEUFELD
ATTORNEY Patented July 22, 1952

UNITED STATES PATENT OFFICE 2,604,600

RADIATION DETECTOR

Jacob Neufeld, Tulsa, Okla., assignor to Well Surveys, Incorporated, Tulsa, Okla., a corporation of Delaware Application May 28, 1947, Serial No. 751,046

9 Claims. (Cl. 313—93)

This invention relates to radiation measuring devices and more specifically to devices of this type having very high efficiency.

All methods of measuring radiations are based on ionization processes whether the instrument is an ionization chamber, or a Geiger counter or a similar instrument. The difference in action between the Geiger counter and the ionization chamber lies in the fact that the response of the counter is equal for all particles or photons, whereas in the case of the ionization chamber the response is largely proportional to the energy of the particles or photons.

The present invention relates to an improvement in radiation measuring devices of the Geiger counter and of the ionization chamber type.

An important object of this invention is to provide a measuring device of a much higher efficiency than the ordinary or conventional Geiger counter or ionization chamber. Another object is to provide such a device as will be sufficiently rugged in comparatively rough service such as in logging of wells and bore holes.

The conventional radiation detectors often consist of a thin-walled tubular metallic cathode and of an elongated thin anode coinciding with the axis of the cathode tube. In a Geiger counter, the anode is usually in the form of a very thin metallic wire, while in an ionization chamber it may have the form of an elongated rod. The anode and the cathode are enclosed in an envelope containing suitable gaseous medium at a determined pressure. The detection of gamma rays by means of such an instrument is based upon an indirect process involving extraction of ionizing electrons. That is, the detector is not directly responsive to the passage of gamma rays but is made to be responsive only if gamma rays liberate ionizing electrons either through the interaction with the gaseous medium within the detector or through the interaction with the cylindrical wall of the detector. The liberated electrons are drawn to the positive anode colliding with the gas molecules in its path and thus liberating further electrons.

In an ionization chamber, the total number of electrons liberated by the collision depends upon the energy of the initial electrons extracted by the incoming photons. A suitable voltage applied across the electrodes creates within the gaseous medium an electrostatic field that collects the products of ionization and causes a current to flow through the output circuit of the ionization chamber. This current represents the energy of all the initial ionizing electrons liberated per second by the incoming photons, and, therefore, it can be used as a measure of the ionizing effectiveness or strength of the radiation.

In an ideal ionization chamber, the interaction of the incoming radiation with matter is complete, i. e., each photon extracts from the cathode wall or from the gas one ionizing electron. Consequently, the total ionization produced in the gas can be made to be substantially representative of the total energy of the incoming gamma radiation. In practice, however, only a very small percentage of photons intercepted by the ionization chamber actually produce ejected electrons. Consequently, the efficiency of the measuring instrument is small. The purpose of the present invention consists in increasing the probability of interaction of the incoming photons or other particles with matter.

In the Geiger counter, the collision process between the primary electron ejected by a photon and the gas molecules becomes cumulative. The instrument is thus behaving as a triggered amplifier, triggered by the incoming particle or photon. This so-called avalanche process must not be allowed to continue indefinitely, and is made to collapse upon itself either by the admixture of some suitable polyatomic vapor such as alcohol, which has a quenching action, or by some external circuit which causes the voltage to drop below the operating voltage of the instrument.

The ideal Geiger counter is one which signals the passage of all photons or particles by producing pulses of the shortest possible duration, the number of pulses being equal to the number of incoming photons or particles. The actual Geiger counter has, however, a low efficiency because only a small fraction of incoming particles or photons releases the impulse producing electrons. The purpose of this invention consists therefore in increasing the efficiency of Geiger counters by increasing the probability of interaction of the photons or particles with matter.

Therefore, the principal object of this invention is to provide a method and apparatus for measuring radiation resulting from nuclear disintegrations. The measurement is based upon the process of interaction of said radiation with matter and the efficiency of such an interaction is arranged to be considerably greater than in the devices of the prior art.

Other objects and advantages of this invention will be apparent from the description which follows when taken with the drawings in which Figure 1 is a diagrammatic view of a Geiger counter of the conventional type;

Figure 2 shows in perspective an improved type of Geiger counter embodying the principles of the present invention;

Figure 3 shows in longitudinal section the counter illustrated in Figure 2;

Figure 4 shows in cross-section various structural details of the Geiger counter embodying the principles of the present invention;

Figures 5a and 5b show horizontal and vertical projections of a conventional counter;

Figures 6a and 6b show horizontal and vertical projections of a counter embodying the principles of the present invention;

Figures 7, 8 and 9 show three types of multiple counters embodying the principles of the present invention;

Figure 10 illustrates diagrammatically the incoming photons and the electrons extracted from the cathode structure in the arrangement of Figure 2;

Figure 11 shows another embodiment of the invention in which the cathode structure consists of two components maintained at different potentials with respect to the anode.

Referring now to Figure 1, there is shown a Geiger counter of standard construction, this counter incorporating as its essential elements a gas-filled housing 11 containing a hollow cylindrical cathode 12 and a wire anode 13 positioned coaxially with respect to the cathode 12. A suitable gas content consists of nine parts argon and one part xylol at a pressure range between one to sixteen centimeters of mercury. The anode 13 is connected to the positive terminal of a source of potential 18 through a resistor 19, and the cathode 12 is connected to the negative terminal of this source.

The potential applied between the cathode and anode of the Geiger tube from the source 18 is approximately the threshold potential so as to initiate a discharge in the tube in response to the passage of an ionizing electron through the space between the cathode and anode. As well understood in this art, the potential is not high enough to initiate a discharge in the absence of an ionizing electron. Each ionizing electron is usually extracted from the cathode of the counter by an incoming photon and causes a discharge impulse by a resultant avalanche of ions, that is, a large quantity of electricity flows for a short time in the counter circuit. This current causes a large voltage drop across the resistor 19 and the discharge will cease after a very short period of time. The frequency of these current impulses can be rendered perceptible if a sensitive frequency measuring instrument 20 is connected across the terminals of the resistor 19 which instrument indicates the strength of incoming radiation by a needle deflection.

The probability of gamma ray photons causing ionization in the gas is very small because not every photon extracts an ionizing electron from the surface of the counter and a great many of them traverse the counter without producing any measurable effect. The ionizing effectiveness of gamma radiation may be increased, however, by enlarging the effective surface exposed to the radiation. Thus a larger number of electrons is extracted, and a larger number of counts is obtained as a measure of the incoming radiations.

The efficiency E of a gamma ray counter is defined as the ratio of the observed counts $N_0$ to the number of gamma ray photons $n$ which pass through the counter during that time, i. e.

$$E=\frac{N_0}{n}$$

This invention consists, therefore, in increasing the efficiency of a gamma ray counter by increasing the effective electron emitting surface contained within the counter and capable of interacting with gamma rays.

Consider now Figure 2, Figure 3 and Figure 4 which show a high efficiency counter embodying the principles of the present invention. Figure 2 shows in perspective the structural arrangement of the electrodes, and Figure 3 and Figure 4 give a more complete representation of various structural details in longitudinal section and cross-section, respectively. The counter shown therein comprises a cylindrical housing 30, commonly a glass tube which contains a suitable gas, such as for instance nine parts argon and one part xylol at a pressure between one and sixteen cm. of mercury. Coaxially with the housing 30 is stretched a fine insulated metallic wire 31 which serves as the anode. The cathode structure consists of a plurality of thin rectangular metallic plates 32 disposed along the radial planes of the cylinder symmetrically with respect to its axis. The plates have their outer edges 33 set into metallic rings which provide electrical connections therebetween. The metallic rings 34 and 35 and consequently the whole anode structure is rigidly supported within the inner walls of the housing 30 by means of suitable supporting rings 36, 37. The plates 32 occupy, longitudinally, the whole axial distance within the housing 30. The width of each of the plates 32 is, however, smaller than the radius of the metallic rings 34 and 35. Consequently, the inner edges 37 of the plates 32 are at a distance from the central wire 31 and provide a suitable space therebetween.

If a high voltage from the battery 38 is applied to the counter tube between the terminal 39, connected to the anode wire, and the terminal 40, connected to the cathode structure, every electron liberated in the interior of the tube by an incoming photon causes a discharge impulse by a resultant avalanche of ions, that is, a large quantity of electricity (current impulse) flows for a short time in the counter tube circuit. This current causes a large voltage drop across the resistor 41, and the discharge will cease after a very short period of time. The frequency of these current impulses can be rendered perceptible if a sensitive frequency measuring instrument 42 is connected to the output terminals of the resistor 41 which instrument indicates the strength of incoming radiation by needle deflection.

It is apparent that the cathode structure of the improved counter of Figures 2, 3 and 4, consisting of radially aligned metallic plates 32, offers to the incoming photons a considerably larger interacting surface than the cylindrical cathode 12 in the conventional counter of Figure 1. Consequently, the number of electrons extracted from the cathode structure of the type shown in Figures 2, 3 and 4 is considerably larger than the number of electrons extracted from the conventional cathode of Figure 1 by the same radiant energy.

The relative efficiency of the counter embodying the present invention as compared to a conventional counter can be visualized from Figures 5a, 5b, 6a and 6b. Figure 5a and Figure 5b designate respectively the vertical and horizontal projections of a conventional counter of the type shown in Figure 1. Numerals 12 and 13 designate cylindrical cathode and wire anode respectively. Figure 6a and Figure 6b designate, respectively, the vertical and horizontal projection of an improved counter of the type shown in Figures 2, 3 and 4. The numeral 32 designates the multiplicity of radially aligned plate memberes constituting the cathode structure and numeral 31 designates the central wire anode. Let the arrow 42 designate the trajectory of a photon impinging upon the counter. In Figure 5b, the arrow 42 intersects the cylindrical wall 12 twice, i. e., at points $T_1$ and $T_2$ while in Figure 6b it intersects the cathode structure five times, i. e., at points $T_3$, $T_4$, $T_5$, $T_6$, and $T_7$. Consequently, the probability of interaction with matter and consequent release of ionizing electrons is accordingly greater in the counter of Figures 6a and 6b than in the conventional counter of Figures 5a and 5b. Consequently, the counter of Figures 6a and 6b is more efficient and the probable error resulting from measurements performed by means of this counter is considerably smaller.

It is, therefore, apparent that I have provided an improved counter in which the conventional tubular cathode structure has been replaced by a structure consisting of a plurality of spaced plate members radially aligned towards the wire anode.

Another way of obtaining a high efficiency counter is to utilize the principles described above in a multiple unit comprising a plurality of thin metallic plate members and a plurality of thin wires located at intersections of planes passing through said plate members. One type of such a multiple counter is shown in Figure 7 which illustrates a section by a plane perpendicular to the wire-anodes. In Figure 7, points 50 represent the anode structure comprising a plurality of thin spaced wire members perpendicular to the plane of the paper and electrically connected to each other by means not shown in the figure. The cathode structure consists of thin metallic plate members 51 conveniently spaced one from another and forming a single structural unit maintained electrically at the same potential. Both the anode structure 50 and the cathode structure 51 are immersed in a suitable gaseous medium within a housing 52. The counter is provided with two output terminals 54, 55, the terminal 54 being connected to the cathode structure 51, and the terminal 55 being connected to the anode structure 50 by means not shown in the figure. A suitable voltage supply 56 in series with resistor 57 is connected across the output terminals 54, 55. The potential applied between the cathode and anode is approximately the threshold potential so that each electron extracted from cathode plate 51 by an incoming gamma ray causes a momentary discharge and a corresponding voltage impulse across the resistor 57. The frequency of the impulses can be rendered perceptible by means of an appropriate frequency meter 59 which provides an indication representing the strength of the incoming radiation.

It is apparent that the only restriction on the number of the cathode plates 51 and anode wires 50 in Figure 7 and their relative spacing depends upon the solid angle consideration and the mechanical and electrical difficulties encountered in the construction of sections with very small spacings. Spacings as small as 2 mm. may be feasible.

Figures 8 and 9 show a different geometrical configuration of cathode plates 51 and anode wires 50. The operation of the counters shown in Figure 8 and Figure 9 are similar to the one of Figure 7 and the elements that are similar in these counters have been designated by the same numerals.

As previously pointed out, the proposed arrangement provides a high probability of interaction between gamma rays and the thin plates forming the cathode structure. The probability of such interaction taking place increases with the increasing thickness of the cathode plates, but, due to the short range of the yielded electrons in the cathode material, the cathode thickness is limited to the order of less than 1 mm. Referring, however, to the present invention as depicted in Figure 10, it is apparent that there is an opportunity for the gamma rays 70 to pass through a larger amount of cathode material with a consequent high probability of interaction together with a good probability that the ejected electron 71 will not have to travel a great distance in the cathode plate 32 before getting out. The advantage of the present arrangement consists, therefore, in providing a large matter path for the gamma ray with a short path for the ejected electron.

For certain applications, it may be desirable to detect radiation which itself is ordinarily non-ionizing, such as slow neutrons. This is commonly done by using a counter whose cathode is of a material which disintegrates or becomes radioactive under slow neutron bombardment with consequent emission of ionizing particles. Such a substance is boron, which commonly occurs in the form of borax. It is believed obvious that the counter herein described may be applied to this use by using plates of suitable material, or by coating the plates with a suitable substance such as a lithium or boron compound. If desired, these counters can be operated at a voltage somewhat lower than the normal threshold and will then respond in a manner proportional to the ionization produced by the particle passing through the sensitive region. This allows the detection of, say, alpha particles ejected by the disintegration produced by slow neutrons, even in the presence of a large gamma-ray background, since an alpha particle will cause a very much greater ionization than will a beta particle due to a gamma ray.

It is apparent that the structural anode arrangement 32 shown in Figure 2 can be utilized in a high efficiency ionization chamber. In an ionization chamber, it would be desirable, however, to replace the thin wire 31 by a suitable elongated rod aligned along the same direction as the wire. The gas within the container 30 should preferably be argon under superatmospheric pressure, and the voltage provided by the battery 38 and applied across the electrodes should be sufficient to collect the products of ionization in the gaseous medium without producing a cumulative ionization.

Consider now again the counter of the type shown in Figure 10. It is apparent that, in a conventional type of radiation detector consisting of a tubular cathode and a wire anode aligned along the axis of the cathode, the electrostatic field is radial, i. e., the lines of force extend radially in all directions from the anode to the cathode. In Figure 10, the tubular cathode has been replaced by a plurality of radially aligned metallic plates 32. These plates form equipotential surfaces and, consequently, the resultant electrostatic field is not radial. In particular in portions of the gaseous medium adjacent to the surface of the plates 32 as, for instance, at such points as M, the component of the field in the radial direction (direction of the arrow m) is extremely weak. In order to increase the radial component of the electrostatic field in the portions of the gaseous medium that are adjacent to the plates 32, a different geometrical configuration illustrated in Figure 11 can be used. Referring now to Figure 11, there is shown in cross-section a detector having a wire anode 31 and a plurality of thin cathode plates radially aligned with respect to the anode. The cathode structure consists of two portions comprising metallic plates 32a and 32b respectively. The plates 32a are radially aligned at a mean distance $R_1$ from the wire. They are electrically connected one to another by means of the wire 80 and maintained by means of a battery 73 at the same negative potential E, with respect to the anode 31.

The plates 32b are farther removed from the anode 31 and are arranged peripherally at a mean distance $R_2 > R_1$ from the anode. The plates 32b are electrically connected one to another by means of the wire 81 and maintained by means of a battery 74 at negative potential $E_2$ with respect to the plates 32a. It is apparent that difference of potential $E_2$ applied between the plates 32a, 32b causes a suitable field strength in the gaseous medium adjacent to the plates and contributes to the increase of the efficiency of the detector. It is apparent that many modifications and variations of the invention, as hereinbefore set forth, may be made without departing from the spirit and scope thereof and, therefore, only such limitations should be imposed as are indicated in the appended claims.

I claim:

1. A radiation detecting device comprising a plurality of plate members disposed in separated relation and connected together electrically to form a cathode member, the planes of said plate members intersecting each other along a common line, means for insulatingly separating said plates for the major portion of their length, an anode member comprising a wire extending through said line and insulated from said cathode plates, an ionizable medium between said cathode member and anode member and an ionization responsive circuit connected between said members.

2. A radiation detecting device comprising a plurality of plates disposed in separated relation and connected together electrically to form a cathode member, the planes of said plates intersecting each other along a plurality of lines, and a plurality of wires disposed in separated relation along said lines, said wires being insulated from said plates and connected together electrically to form an anode member.

3. A radiation detector comprising a wire electrode, a plurality of thin metallic plates positioned in the neighborhood of said wire electrode, said plates having their surfaces substantially coinciding with planes passing through the axis of said wire electrode, an electrical terminal and connections between said terminal and said plates whereby said plates are maintained at the same electrical potential, means for insulatingly separating said plates for the major portion of their length, an ionizable medium between said wire electrode and said metallic plates, and an ionization responsive circuit connecting said wire electrode to said metallic plates.

4. A radiation detector comprising an elongated wire element, a plurality of thin plates positioned in the neighborhood of said wire element and having their surfaces substantially coinciding with planes passing through the axis of said wire element, said surfaces being exposed to an impinging radiation and emitting electrons as a result of the interaction with said radiation, means for insulatingly separating said plates for the major portion of their length, an ionizable medium between said wire elements and said plates, said medium being adapted to be ionized by said electrons, and means for producing an electrostatic field converging at said wire element for collecting the products of ionization at said wire element, said ionization products indicating said radiation.

5. A radiation detecting device comprising an elongated wire element forming one electrode, a plurality of spaced metallic plates radially disposed about said wire element, said plates being electrically connected one to another and forming the other electrode, means for insulatingly separating said plates for the major portion of their length, an ionizable medium between said electrodes and an ionization responsive circuit connected between said electrodes.

6. A radiation detector comprising an elongated wire electrode and another electrode comprising at least two plates mounted in radial direction to said wire, means for insulatingly separating said plates for the major portion of their length, an ionizable medium between said electrodes, and an ionization responsive circuit connected between said electrodes.

7. A radiation detector comprising an elongated wire electrode and another electrode comprising at least three plates mounted in radial direction to said wire, means for insulatingly separating said plates for the major portion of their length, an ionizable medium between said electrodes, and an ionization responsive circuit connected between said electrodes.

8. A radiation detector comprising a metallic cathode member, an anode wire extending along the longitudinal axis of said cathode member, means for impressing an electrical potential across said cathode member and said anode, said cathode member including a plurality of elongated metallic fins disposed parallel to and projecting radially inwardly toward said anode wire, separate means at the ends of said fins electrically connecting and mechanically supporting said fins, said means and said fins forming an open frame-like cathode structure, the inner edges of said fins being parallel to and spaced equidistantly from said anode wire so that the strength of the electrical field will be the same between the anode wire and the inner edge of each of said fins, and a housing for said members adapted to contain a gaseous filling.

9. A radiation detector comprising a sealed housing containing a gaseous filling, a cathode member, a wire anode, said cathode member including a plurality of elongated thin substantially parallel metallic fins projecting radially inwardly toward said anode member, separate means at the end of said fins electrically connecting and mechanically supporting said fins, said means and said fins forming an open frame-like structure, the inner edges of said fins defining an elongated space substantially round in cross section and extending longitudinally through said cathode member, said anode wire extending along the longitudinal axis of said elongated space, and means for impressing an electrical potential across said cathode member and said anode wire, the strength of the electrical field resulting between the anode wire and the inner edges of said fins being uniform throughout the length of the cathode member.

JACOB NEUFELD.

REFERENCES CITED

The following references are of record in the file of this patent:

UNITED STATES PATENTS

| Number | Name | Date |
|---|---|---|
| 1,775,219 | Van Horne | Sept. 9, 1930 |
| 2,172,198 | Harnisch | Sept. 5, 1939 |
| 2,397,071 | Hare | Mar. 19, 1946 |
| 2,397,073 | Hare et al. | Mar. 19, 1946 |

OTHER REFERENCES

Review of Scientific Instruments, vol. 4, December 1933, pages 676–678.

Korff and Ramsey, Review of Scientific Instruments, vol. 11, August 1940, pages 267–269.